July 27, 1954     R. S. CHILDS     2,685,070
VARIABLE INDUCTANCE MEASURING APPARATUS
Filed Oct. 27, 1948     2 Sheets-Sheet 1
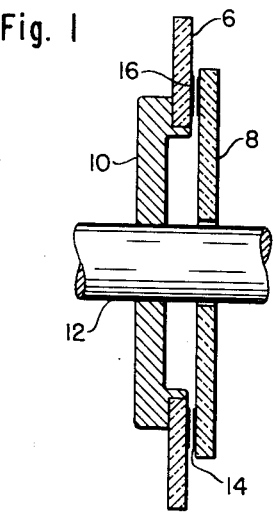
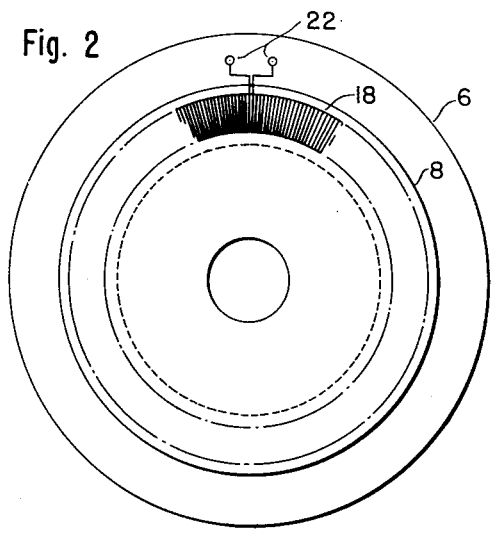
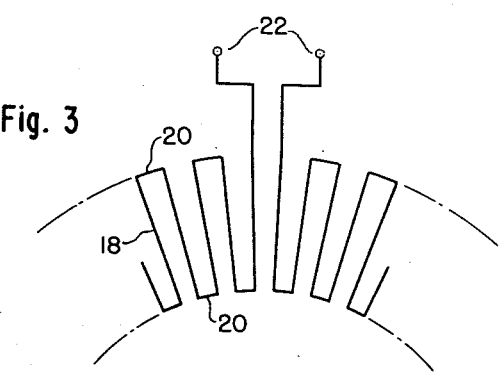
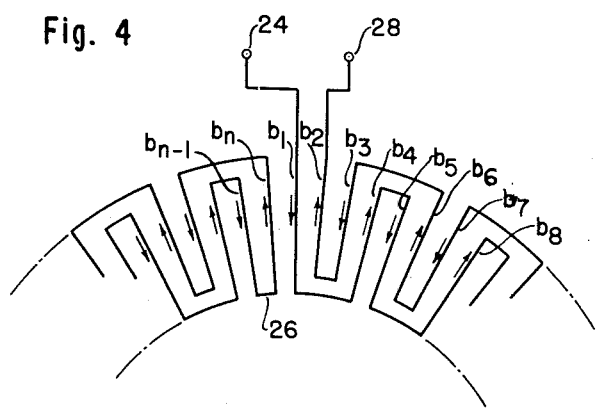
INVENTOR
ROBERT S. CHILDS
BY Kenway, Jenney, Witter & Hildreth
ATTORNEYS July 27, 1954  R. S. CHILDS  2,685,070
VARIABLE INDUCTANCE MEASURING APPARATUS
Filed Oct. 27, 1948  2 Sheets-Sheet 2

INVENTOR
ROBERT S. CHILDS
BY Kenway, Jenney, Witter
 & Hildreth
ATTORNEYS

Patented July 27, 1954

2,685,070

UNITED STATES PATENT OFFICE 2,685,070

VARIABLE INDUCTANCE MEASURING APPARATUS

Robert S. Childs, South Sudbury, Mass., assignor, by mesne assignments, to Edward G. Martin, Cambridge, Mass.

Application October 27, 1948, Serial No. 56,836

6 Claims. (Cl. 336—123)

The present invention relates to improvements in the measuring device described in my co-pending application Serial No. 794,192 filed December 27, 1947, now Patent No. 2,650,352 dated August 25, 1953. More particularly this invention involves a means for reducing or eliminating undesirable capacitive coupling between the input and output of the measuring device.

The aforementioned device depends for its operation upon inductive coupling between a rotor, to which in the preferred embodiment high frequency voltage is applied, and a stator. For reasons explained in said application a non-ferrous core is used for the stator and rotor and the inductively induced voltage in the secondary member is a small fraction of the voltage imposed on the primary. At the same time the windings of the stator and rotor which oppose each other across a narrow air gap constitute a substantial distributed capacitance, and at the high frequency (preferably of the order of 100 kilocycles per second) used in this device, the capacitive coupling between stator and rotor becomes correspondingly large; that is, the capacitive voltage appearing in the secondary output becomes substantial. As a result of the small inductive voltage and of the high stator-to-rotor capacitive coupling, the capacitive component of the output voltage may be of such size as to mask the inductive voltage. Furthermore, the magnitude of the capacitive component varies with the relative positions of the stator and rotor. The apparatus is primarily for the purpose of distinguishing the angle of rotor rotation by the magnitude of inductive output voltage. However, the effect of the large capacitive voltage is to render it difficult to determine the inductive voltage accurately.

The principal object of this invention is to eliminate distributed capacitance effects without impairing the inductive coupling upon which the accurate measurement of small rotor angular displacement depends.

Other objects and advantages of this invention will be apparent from the following description.

Figure 5:
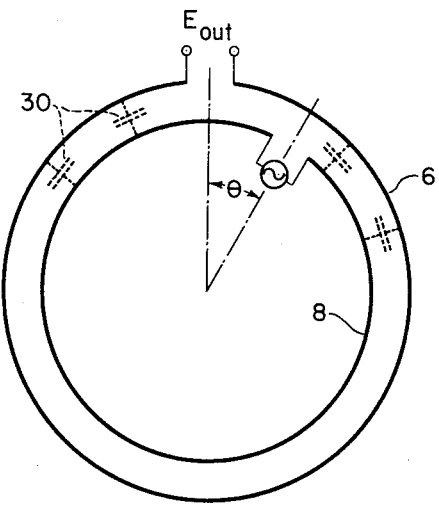
Figure 6:
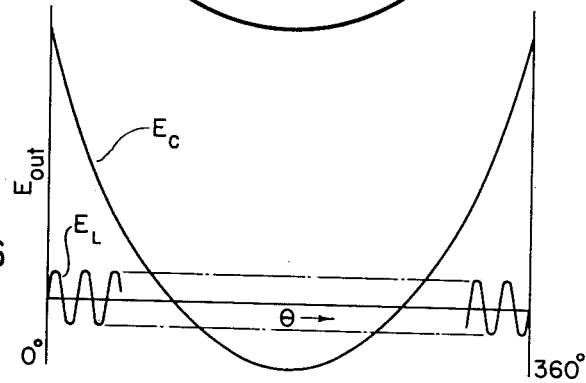
Figure 7:
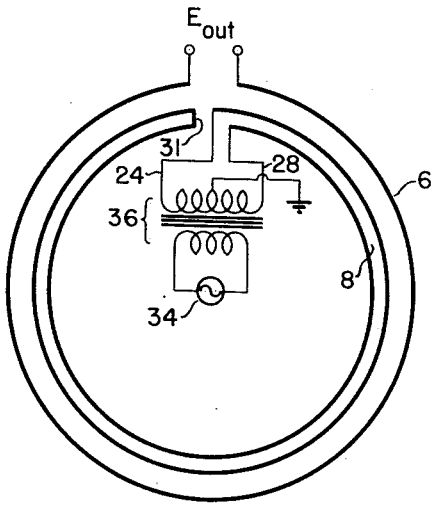

In the accompanying drawings, Fig. 1 is a view in sectional elevation of apparatus embodying the present invention; Fig. 2 is a view in front elevation of the apparatus shown in Fig. 1, only a portion of the winding being represented for the sake of simplicity; Fig. 3 is a schematic view on an enlarged scale of a portion of the stator winding; Fig. 4 is a view of a corresponding portion of the rotor winding; Fig. 5 is a schematic representation of the capacitive relationship of the elements in an apparatus using windings of the type disclosed in my prior application; Fig. 6 is a graph of the voltage output vs. rotor angular displacement of such an apparatus; and Fig. 7 is a schematic representation of the capacitive relationship of the elements in apparatus using a rotor winding of the type shown in Fig. 4 and embodying my present invention.

The illustrated embodiment of the invention (Fig. 1) comprises a primary member 6 and a secondary member 8, of which one, preferably the primary, is a rotor, while the other is a stator. As shown in Fig. 1, the stator and rotor may comprise disks, preferably of glass, arranged face to face with as small an air gap as possible. The rotor is suitably mounted on a hub or spider 10 which in turn is mounted on a shaft 12. The stator carries a deposited metal conductor indicated by heavy lines 14 in Fig. 1 and the rotor carries a deposit 16 opposed to deposit 14.

The stator winding is shown in Fig. 2 and is schematically enlarged in Fig. 3; it is identical with the winding described in my prior application. The stator deposit comprises a conductor in the form of a fine grid-like structure arranged around the periphery of the disk. The conductor comprises a single conductor arranged in zig-zag or back-and-forth fashion, whereby there is formed a succession of juxtaposed series-connected "bars" 18. In this form of the invention the bars are radially disposed. The individual bars are connected at their ends by short connectors 20. The ends of the conductors are connected to terminals 22. The deposition of the conductor may be effected in any desired way, as by evaporation of metal, such as aluminum in the desired pattern determined by a mechanical or photographic process, as will be understood by those skilled in the art. In the actual construction there may be 1000 or more bars 18 in the complete stator, but the spacing is necessarily exaggerated in the drawing.

The winding on the primary (rotor) 6 is similar to that on the secondary in so far as current relations are concerned, but markedly different in respect to voltage distribution. As shown in Fig. 4, starting with terminal 24, the first conductor bar $b_1$ is directed radially inward. This bar is connected at its inner end with bar $b_4$ which in turn is connected with $b_5$, then to $b_8$ and so on. This series of connected bars terminates with bar $b_n$ at 26 adjacent to bar $b_1$, and another series is formed which doubles back on the first series, finally ending at terminal. It will be seen that the last bars in the second or doubled-back series are bars $b_7$, $b_6$, $b_3$ and $b_2$, the last-named being connected directly to the terminal 28. The arrows in Fig. 4 which indicate current distribution is obtained as if bars $b_1$, $b_2$, $b_3$, $b_4$, etc. were series-connected in that order. The angular spacing between consecutively numbered bars is the same as the spacing of the stator bars. Hence the apparatus functions exactly like that of my prior application in so far as inductive effects are concerned. The terminals 24 and 26 are connected to the voltage source through brushes and slip-rings or other suitable coupling means. The voltage source is center-tapped and grounded at the center-tap by means of a center-tapped transformer which is familiar to those skilled in the art.

The operation of my invention to eliminate capacitive coupling will be explained with relation to Figs. 5 to 7. In Fig. 5 the windings on the stator 6 and on the rotor 8, as used in the apparatus of my prior application, are represented schematically as metallic bands between which there is a capacitive coupling, due to the distributed capacitance represented by the small condensers in dotted lines 30. The zig-zags are removed for ease of illustration since they make no contribution to the capacitive coupling. The input voltage is applied to the rotor in most applications of the apparatus to servomechanisms. The instantaneous voltages on the stator are very small compared to the rotor applied voltage. A mathematical analysis in terms of distributed parameters shows that the capacitively-coupled output voltage $E_c$ between the stator terminals is a function of the rotor angular position $\theta$ in the manner shown graphically in Fig. 6. In this graph, $\theta$ is measured from the point at which the rotor and stator terminals are in the same angular position. In Fig. 6 is also plotted $E_L$, the inductive component of voltage for different values of $\theta$ for zig-zag conductors of the type shown in my prior application. It is apparent that the capacitively-coupled voltage $E_c$ tends to mask the inductively-coupled voltage $E_L$ by which the apparatus is intended to measure rotor angular position.

The present invention, on the other hand, results in essentially zero capacitively-coupled voltage output because of cancellation of potentials at any given point in the neighborhood of the rotor-winding. Fig. 7 shows the new winding schematically. In this figure the zig-zags have been removed, as in Fig. 5, without affecting the correctness of the representation of the apparatus in respect to capacitance coupling effects. This diagram simply shows the winding on the rotor 8 as a doubled-back loop with the two halves of the loop close together, the midpoint of the loop appearing at 31 immediately adjacent the terminals. The input voltage at 34 is applied through a transformer 36 that is center-tapped and grounded. At any instant the opposite terminals 24 and 28 of the rotor winding will be respectively positive and negative by like amount; and the midpoint 31 of the loop is at zero voltage. Because of the comparative smallness of the stator-induced voltage, all the stator may be thought of as being at ground potential. The potential distribution along the loop of the rotor winding is determined by the distributed parameters but is in any event substantially symmetrical with respect to the closed end of the loop. At each point around the rotor the capacitively-coupled voltages of the two sides of the loop are in opposition, with the result that no substantial capacitance voltage appears at the stator terminals. This balanced relationship exists for all angular positions of the rotor; hence the magnitude of $E_c$ reduces to practically zero throughout the entire range. However, as previously noted, the distribution of current in Fig. 4 is identical with that of my prior application, and therefore the inductive effects remain unchanged. The inductive voltage $E_L$ remains as in Fig. 6, and now appears at the output unmasked by any capacitive voltage.

It will be understood that my invention may be applied to a device used for linear measurements as well as to the device for measuring angles. It also may be used with a multiphase stator winding such as is necessary for servomechanism applications.

Having thus described my invention, I claim:

1. Apparatus for electrical measurement comprising two relatively movable members, a number of conductors extending back and forth across said members, the conductors of one member being series-connected each to the adjacent preceding conductor, the conductors of the other member forming with their interconnections a single conducting winding doubled back on itself with the open ends adjacent to each other, the said conductors on the members being in accurately-spaced angular arrangement, the conductors of the two members being in inductive relationship and having the same angular spacing.

2. Apparatus for electrical measurement comprising two relatively movable members, a number of conductors extending back and forth across said members, the conductors of one member being series-connected each to the adjacent preceding conductor, the conductors of the other member forming with their interconnections a continuous conducting path doubled on itself at its midpoint, the conductors of one half of the path being alternated in position with the conductors of the other half, the said conductors on the members being in accurately-spaced angular arrangement, the conductors of the two members being in inductive relationship and having the same angular spacing.

3. Apparatus for electrical measurement comprising two relatively movable members, a number of conductors extending back and forth across said members, the conductors of one member being series-connected each to the adjacent preceding conductor, the conductors of the other member forming with their interconnections a single conducting winding doubled back on itself with the open ends adjacent to each other, the conductors on the members being in accurately-spaced angular arrangement, the conductors of the two members being in inductive relationship and having the same angular spacing, and means for applying an alternating-current voltage to the winding of the second member, said means being arranged to place the ends of said winding at instantaneously equal and opposite voltages.

4. Apparatus for electrical measurement comprising two relatively movable members, a number of conductors extending back and forth across said members, the conductors of one member being series-connected each to the adjacent preceding conductor, the conductors of the other member forming with their interconnections a continuous conducting path doubled on itself at its midpoint, the conductors of one half of the path being alternated in position with the conductors of the other half, the said conductors on the members being in accurately-spaced angular arrangement, the conductors of the two members being in inductive relationship and having the same angular spacing, and means for applying an alternating-current voltage to the conducting path on the second member, said means being center-tapped to place any two points equidistant from the ends of the conducting path at instantaneously equal and opposite voltages.

5. In apparatus for electrical measurement, a winding comprising conductors arranged at regular angular spacing, terminal connections to two adjacent conductors, interconnections between the conductors, said interconnections being so disposed that, if the conductors are numbered seriatim starting with the terminal conductors, the conductors are interconnected in the following orders: 1—4—5—8 . . . and 2—3—6—7 . . . , the last two conductors in the two series being interconnected to form a single continuous circuit between the terminals.

6. Apparatus for electrical measurement comprising two relatively movable members, a number of conductors arranged at regular angular spacing on each of the members, the conductors of the two members being in inductive relationship and having the same angular spacing, terminal connections to two adjacent conductors on each of the members, interconnections between the conductors on each of the members, the interconnections on one of the members forming a circuit between the terminals, and the interconnections on the other member being so disposed that, if the conductors are numbered seriatim starting with the terminal conductors, the conductors are interconnected in the orders 1—4—5—8 . . . and 2—3—6—7 . . . . the last two conductors in the two series being interconnected to form a single continuous circuit between the terminals.

References Cited in the file of this patent

UNITED STATES PATENTS

| Number | Name | Date |
|---|---|---|
| Re. 22,139 | Case | July 21, 1942 |
| 261,520 | Ball | July 25, 1882 |
| 1,630,757 | Perkins | May 31, 1927 |
| 1,639,044 | Nlansbridge | Aug. 16, 1927 |